United States Patent [19]

Ewing

[11] Patent Number: 5,553,188
[45] Date of Patent: Sep. 3, 1996

[54] VAPORIZER AND LIQUID DELIVERY SYSTEM USING SAME

[75] Inventor: James H. Ewing, Lexington, Mass.

[73] Assignee: MKS Instruments, Inc., Andover, Mass.

[21] Appl. No.: 393,723

[22] Filed: Feb. 24, 1995

[51] Int. Cl.[6] .............................. F22B 1/28; F22B 27/00
[52] U.S. Cl. ............................ 392/394; 392/399; 122/40; 122/41
[58] Field of Search .................................... 392/386, 388, 392/394–399, 400–402, 485; 122/40–41

[56] References Cited

U.S. PATENT DOCUMENTS

| | | |
|---|---|---|
| 414,207 | 11/1889 | Gillet .......................... 392/399 |
| 709,926 | 9/1902 | de Porto-Riche .................. 392/399 |
| 1,344,303 | 6/1920 | Little ............................ 392/399 |
| 3,119,004 | 1/1964 | Hoop . |
| 4,352,252 | 10/1982 | Brenot . |
| 4,724,824 | 2/1988 | McCoy et al. . |
| 5,078,976 | 1/1992 | Shibauchi et al. ................ 392/399 |
| 5,204,314 | 4/1993 | Kirlin et al. . |
| 5,361,800 | 11/1994 | Ewing . |
| 5,371,828 | 12/1994 | Ewing . |
| 5,421,895 | 6/1995 | Tsubouchi et al. ............... 392/399 |

FOREIGN PATENT DOCUMENTS

0352727A2  7/1989  European Pat. Off. .

Primary Examiner—Teresa J. Walberg
Assistant Examiner—Sam Paik
Attorney, Agent, or Firm—Lappin & Kusmer LLP

[57] ABSTRACT

A liquid vaporizer includes a stack of coaxially aligned, thermally conductive, thin, flat disks having different diameters. The larger diameter disks each include at least one aperture and preferably a plurality of closely spaced apertures radially located a predetermined distance from the center of the disk. The vaporizer further includes means for establishing a liquid film on at least a portion of the surfaces of the larger diameter disks and for accelerating the vaporization of the liquid thereon by passing a gas through the apertures of the larger diameter disks over the liquid film on the portion of the surfaces of the larger diameter disks.

29 Claims, 6 Drawing Sheets

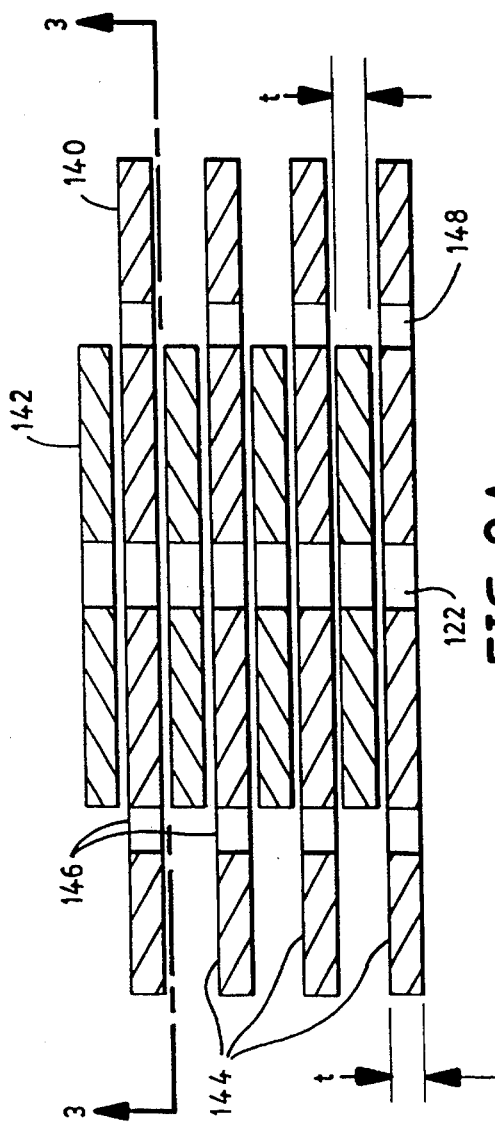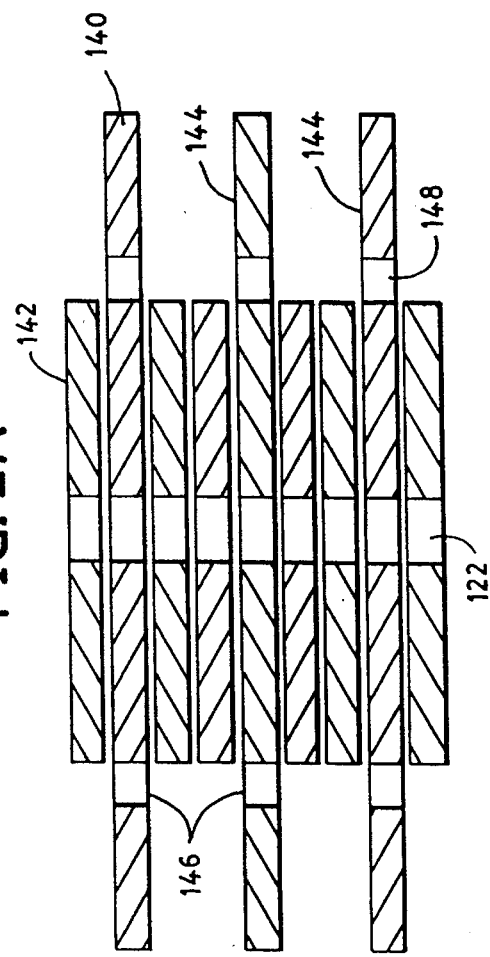

pharmaceutically effective amount of a liquid material in vapor form.

VAPORIZER AND LIQUID DELIVERY SYSTEM USING SAME

FIELD OF INVENTION

The present invention relates to liquid vaporizers and more particularly to a liquid vaporizer in which vaporization of a liquid is accelerated by the use of a novel arrangement of coaxially-aligned, thin, flat, thermally-conductive disks having different diameters, and by the introduction of a gas in a novel and useful way.

BACKGROUND OF THE INVENTION

Various processes utilize reactive gases carefully introduced into a processing chamber. For example, in the semi-conductor industry, precisely controlled amounts of a processing gas are often carefully introduced into a processing chamber for reaction with certain material(s) on a wafer to produce desired structures or devices. Some of these gases would be liquids at the process temperature and pressure and are generally classified as low vapor pressure liquids. It is not uncommon for a process to be run at a temperature and pressure where one of the required materials will not exist in purely gaseous form. The typical method of providing such materials in vapor form uses a device referred to as a bubbler. A bubbler is a heated container partially filled with the liquid in question. A gas is bubbled up through the liquid and combines with the vapor from the liquid. The resulting gas/vapor mixture is then introduced into the process. Bubblers are not ideally suited to the precise control required for introduction of vapor to a processing chamber because of cumbersome plumbing and heating problems associated with those devices.

Accordingly, attempts have been made to create a flash vaporizer, particularly adapted for semi-conductor processes, for providing various materials in vapor form. Flash vaporizers are disclosed, for example, in U.S. Pat. Nos. 5,361,800 and 5,371,828 to Ewing, currently assigned to the assignee of the present invention. The disclosed vaporizers include a heater assembly in thermal contact with a stack of thermally conductive, thin, flat disks biased together with a spring-loaded anvil. The heater assembly heats the disks to a temperature in excess of the flash point of the liquid to be vaporized at the process pressure. Liquid is supplied from a pumping system through a tube passing through the center of the coaxially stacked disks and is forced between the parallel disks, against the bias of the spring-loaded anvil. The liquid is heated by the hot surfaces of the disks to a temperature above its flash point and is vaporized.

However, there are many liquids that cannot be vaporized at the process temperature and pressure. The present invention is useful in addressing this limitation of the prior art devices.

As used herein, the term "evaporation" means the conversion of a liquid to a vapor by the addition of latent heat. "Vaporization", or "volatilization", means the conversion of a liquid to a vapor by the application of heat and/or by reducing the pressure on the material.

It is known that an equilibrium condition exists above the surface of a liquid, such that the number of molecules escaping the liquid surface equals the number of molecules re-entering the liquid. Each liquid has a characteristic vapor pressure-temperature profile. One can accelerate the vaporization process by increasing the rate at which vapor molecules escape from the liquid surface, by decreasing the rate at which liquid molecules reenter the liquid surface, and by increasing the vaporization surface area. By increasing the temperature of the liquid, the rate at which vapor molecules escape the liquid surface can be increased. By removing the escaping vapor molecules as they leave the liquid surface (thereby effectively lowering the pressure on the liquid surface), the reentry rate can be decreased. If the pressure on the liquid surface is constant, one can effectively reduce the partial pressure of the vapor molecules above the liquid surface, and thus accelerate the removal of vapor molecules from the liquid surface, by flowing a gas across the liquid surface. See, for example, U.S. Pat. No. 5,204,314 to Kirlin et al., in which a carrier gas is flowed past a heated foraminous matric element upon which the source reagent is deposited in liquid form to yield a carrier gas mixture containing the source reagent which is subsequently introduced into a processing chamber.

This vaporization process can be further optimized by increasing the vaporization surface area. For rapid vaporization, the liquid should form an extremely thin film on the vaporization surfaces, such as the heated disks in the Ewing patents. Thus, a large vaporization area and a means for accelerating the vaporization would be a desirable and beneficial combination.

OBJECTS OF THE INVENTION

It is an object of the present invention to provide a means for rapidly converting a low vapor pressure liquid to a vapor.

Another object of the present invention is to provide an improved liquid vaporizer over those described in the above-noted prior art.

And another object of the present invention is to accelerate the vaporization rate of a liquid in a vaporizer.

Yet another object of the present invention is to increase the ability of the liquid to form a film on the surfaces of the heated disks in the flash vaporizer of the type described in U.S. Pat. Nos. 5,361,800 and 5,371,828.

Still another object of the present invention is to provide a vaporizer which can be used with or without an auxiliary gas.

SUMMARY OF THE INVENTION

These and other objects of the present invention are achieved by a liquid vaporizer which provides a precisely controlled amount of liquid material in vapor form.

In accordance with one aspect of the present invention, the vaporizer comprises an enclosed vaporizing chamber having an inlet port, an outlet port, and a stack of coaxially-aligned, thermally-conductive, thin, flat disks comprising a first plurality of larger diameter disks of a first diameter $D_1$ stacked with a second plurality of smaller diameter disks of a second diameter $D_2$ smaller than $D_1$. The stack of disks is positioned within the vaporizing chamber between the inlet port and the outlet port so that a liquid entering the chamber through the inlet port is forced between adjacent disks of the stack and is vaporized prior to exiting the outlet port. The evaporator vaporizer further includes biasing means for axially compressing the disks of the stack together, and heating means for heating the disks to a temperature sufficient to vaporize the liquid.

In accordance with another aspect of the present invention, a liquid vaporizer comprises an enclosed vaporizing chamber having an inlet and outlet port, a plurality of coaxially-aligned, thermally-conductive, thin, flat heatable disks sized, shaped and assembled so as to provide a vaporization area, and biased together so that liquid introduced into the inlet port passes between the disks. The vaporizer includes means for introducing a gas into the vaporization area so as to accelerate the vaporization of liquid introduced into the vaporization area. In one embodiment, where at least two disk sizes are provided, means are provided for establishing a liquid film on at least a portion of the surfaces of the larger diameter disks and for accelerating the vaporization of the liquid. In another embodiment where at least two disk sizes are provided, the vaporization area is defined as including the outer perimeter of each larger diameter disk of the stack of disks. Each of the larger diameter disks includes at least one aperture, and preferably a plurality of apertures closely spaced equidistantly from the center of each disk by a predetermined amount, for introducing the gas.

In accordance with another aspect of the present invention, the vaporizer includes pluralities of disks of at least two diameter sizes, with each of the plurality of larger disks being adjacent to at least one disk of the other plurality of smaller disks.

In accordance with another aspect of the present invention, an apparatus for vaporizing a liquid into a gas comprises a liquid vaporizer as described above in combination with a positive displacement pump system coupled to the inlet port of the vaporizing chamber. The positive displacement pump system delivers liquid to the vaporizer at a substantially continuous and constant volumetric rate and pressure.

Other objects of the invention will in part be obvious and will in part appear hereinafter. The invention accordingly comprises the apparatus possessing the construction, combination of elements and arrangement of parts which are exemplified in the following detailed disclosure, the scope of which will be indicated in the claims.

BRIEF DESCRIPTION OF THE DRAWINGS

For a fuller understanding of the nature and objects of the present invention, reference should be had to the following detailed description taken in connection with the accompanying drawings, wherein:

FIG. 2A is a cross-sectional view of a stack of coaxially aligned, thermally conductive, thin, flat disks in a preferred arrangement within the liquid vaporizer;

FIG. 2B is a cross-sectional view of a stack of coaxially aligned, thermally conductive, thin, flat disks in an alternative arrangement within the liquid vaporizer;

DETAILED DESCRIPTION OF THE DRAWINGS

Figure 1:
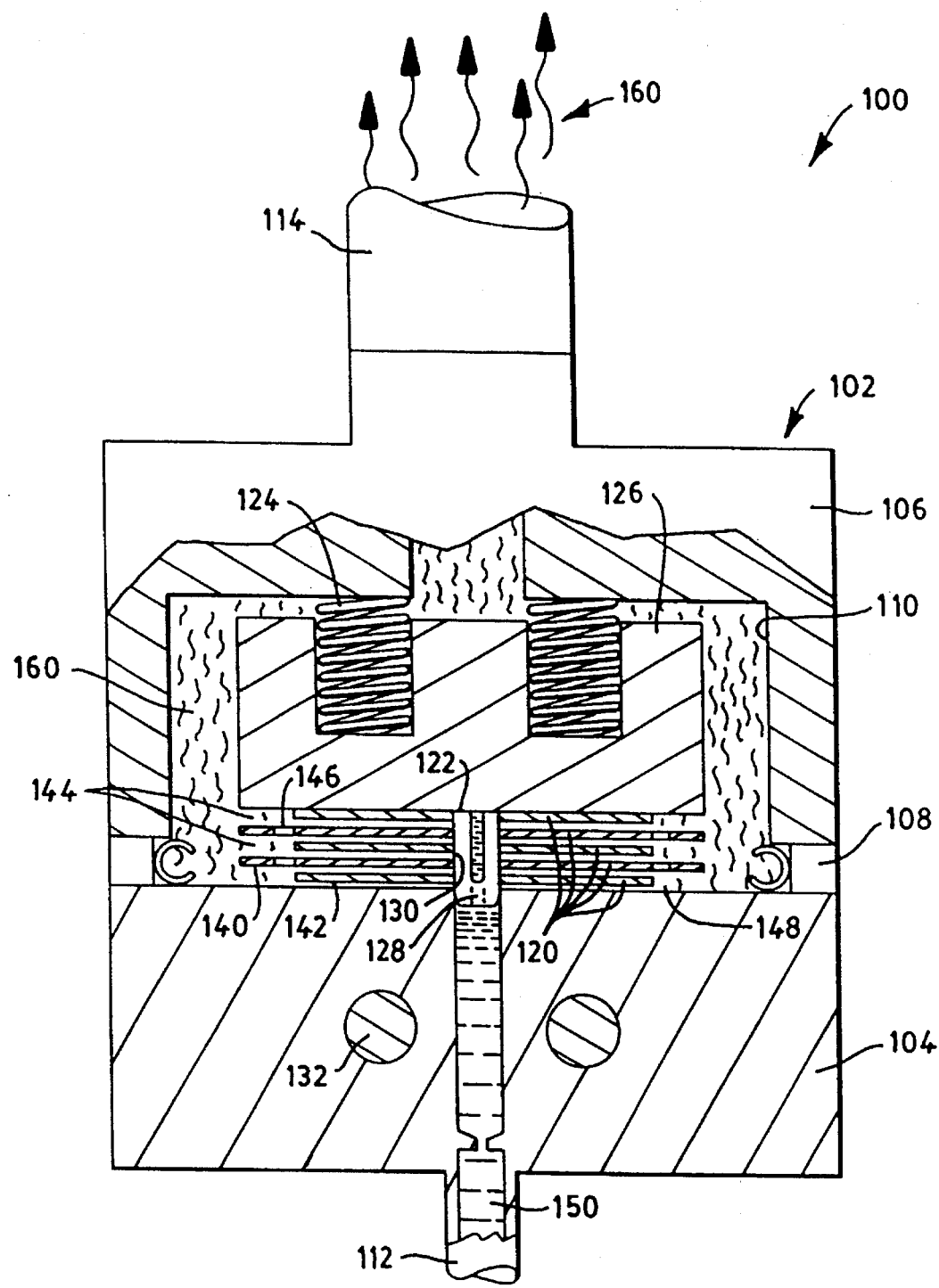
FIG. 1 is a side view, in partial cross section, of one embodiment of a liquid vaporizer of the present invention.

In the drawings the same numbers are used to refer to the same or similar parts, and the same number with letters designates identical parts.

Referring to FIG. 1, the liquid vaporizer of the present invention, generally shown as 100, comprises a block assembly 102 including a heating block 104 and a cover block 106 with a suitable seal 108 secured therebetween. The blocks 104 and 106 and seal 108 are shaped and secured together so as to define an enclosed vaporizing chamber 110 having an inlet 112, preferably formed through the heater block 104, for the introduction of a liquid 150 thereto, and an outlet 114 from which vapor 160 exits the chamber. The vaporizer 100 further includes a stack of coaxially aligned, thermally-conductive, thin, flat disks 120. The disks include central apertures 122, all of which are axially aligned in the stack and preferably mounted coaxially with the inlet port 112. The vaporizer 100 also includes means, in the form of one or more compression springs 124 and an anvil 126, for axially compressing the disks 120 together. The anvil 126 preferably physically and thermally contacts substantially the entire surface of the upper disk 120 of the stack and functions to insure the application of a uniform axial compression force on the disks exerted by the springs 124. As shown in FIG. 1, the anvil 126 is a relatively massive structure and is preferably made of a thermally conductive material which will help retain heat in the disks so as not to dissipate heat appreciably from the disks. The compression springs 124 should also be made of a thermally conductive material because they are in thermal and physical contact with the anvil 126.

A tube 128 is disposed within the apertures 122 and has radially directed apertures 130 for directing liquid 150 from the inlet 112 to the inner circumferential edges of the central apertures 122 so that the liquid can be forced between the disks against the bias of the springs 124. The vaporizer 100 also includes a heating unit 132, such as a heating coil, for heating the heating block 104 and the disks 120 so as to heat liquid 150 passing through the inlet 112 and between the disks 120 to a temperature sufficient to vaporize the liquid. The heating unit 132 can include any type of suitable heating device and can include, for example, a resistive heating coil, which is preferably embedded in and in thermal contact with the heating block 104 so that heat is distributed as evenly as possible through the disks 120. The heating unit 132 is connected to a source of power (not shown) and should be capable of heating the disks 120 to a range of temperatures at which the liquid can be converted to a vapor.

Figure 3:
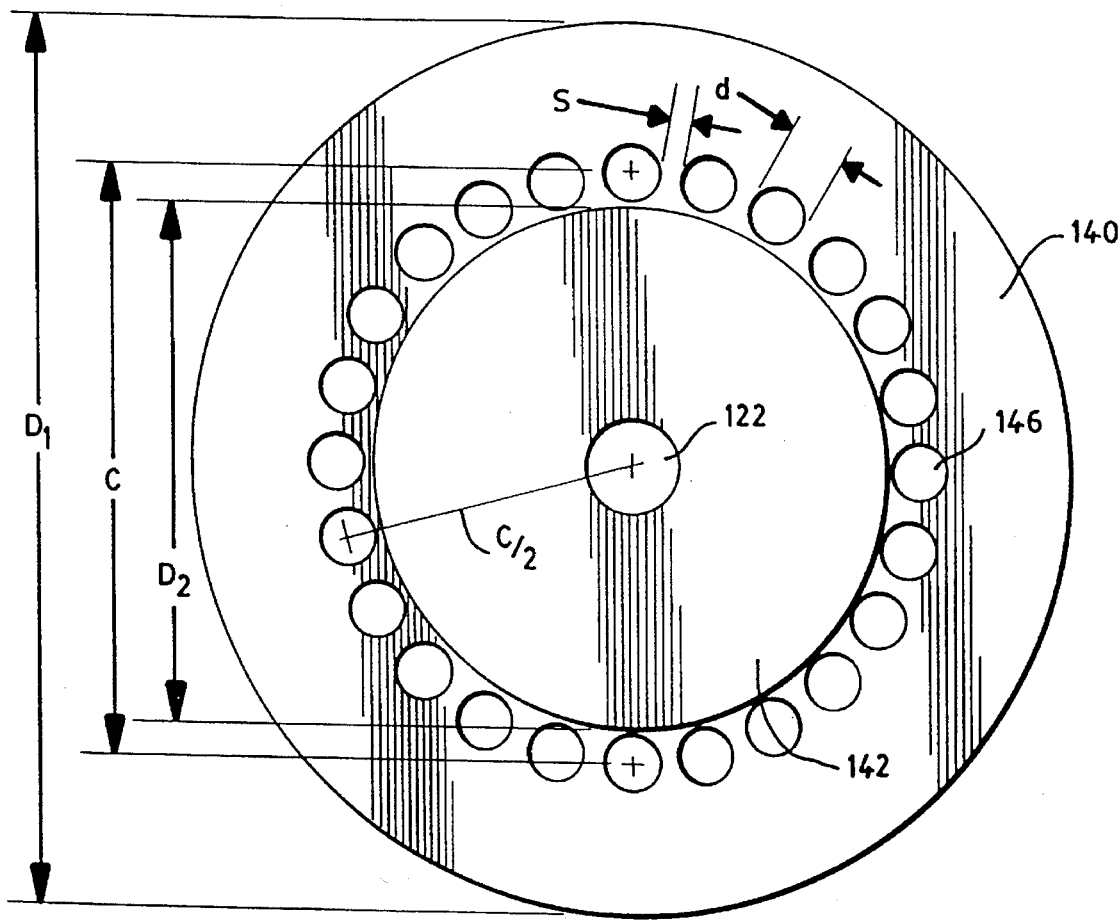
FIG. 3 is a radial sectional view of the stack of disks shown in FIG. 2A, in which a larger diameter disk and a smaller diameter disk are adjacent to one another in the stack of disks, and in which various dimensions of the disks are shown.

Referring to FIGS. 1, 2A, 2B and 3, and in particular to FIG. 3, in accordance with one aspect of the present invention, the stack of coaxially aligned, thermally conductive, thin, flat disks 120 comprises a first plurality of larger disks 140 having a first diameter $D_1$ and a second plurality of smaller disks 142 having a second diameter $D_2$ so that the diameter $D_1$ is larger than $D_2$. The total number of disks can vary depending on the rate at which liquid is to be vaporized. Further, the thickness of all the disks, both small and large, should be approximately the same, although it should be appreciated that the thicknesses can vary as, for example, the larger disks could be thicker or thinner than the smaller disks. The diameters of the larger and smaller disks 140 and 142, respectively, are preferably each relatively great in comparison to the thickness, t, of the disks, with the ratios of the larger diameter $D_1$ to the thickness t and the smaller diameter $D_2$ to the thickness t being in the order of 1000:1, although these ratios can clearly vary. For example, in one preferred embodiment the dimensions include $D_1$=1.25 inch, $D_2$ =1.00 inch, and t=0.00075 inch.

Preferably, each disk from the first plurality of larger diameter disks 140 is adjacent to and in contact with at least one smaller diameter disk 142. FIGS. 2A and 2B illustrate two of any number of possible arrangements of disks 140 and 142 within the vaporizer 100. As shown in FIG. 2A, in a preferred arrangement of disks, the larger and smaller disks are stacked in an alternating fashion so that the disks alternate (i.e., large, small, large, small, large, small, etc.). This arrangement separates the larger diameter disks 140 from one another by a distance t, the thickness of a single smaller diameter disk. Preferably, but not necessarily, the disks at each end of the stack should be smaller for reasons which will become more evident hereinafter. As illustrated in FIG. 2B, the disks can also be arranged, for example, so that a single larger diameter disk 140 is sandwiched between two smaller diameter disks 142, the smaller diameter disks of each sandwiched set being adjacent to one another. Regardless of the particular arrangement of disks or the respective thicknesses of the disks, as will be more apparent hereinafter, as stacked the area beyond the periphery of the smaller diameter disks (between confronting larger diameter disks, between the upper larger diameter disk and the anvil 126, and between the bottom larger diameter disk and the heating block 104), forms vaporization areas, designated 144, provided by virtue of the spacings created by the presence of the smaller diameter disks 142 in the stack of disks 120.

In accordance with another aspect of the present invention, as shown most clearly in FIG. 3, each of the larger diameter disks 140 includes at least one and preferably a plurality of apertures 146 for accelerating vaporization of the liquid 150 from the heated surfaces of the disks, in particular from the portion of the heated surfaces of the larger diameter disks 140 in the vaporization areas 144.

Preferably, the larger diameter disks 140 each include a plurality of apertures 146 spaced around and radially spaced from the center of each of the disks. In a preferred embodiment, the apertures 146 are closely spaced a distance S apart from one another on each of the larger diameter disks 140 around an aperture circle of diameter C, as shown in FIG. 3. The apertures 146 are preferably equidistantly spaced from the center of the disk 140 by a distance of C/2 and are preferably separated from one another by a distance S which is less than the diameter or width d of the apertures 146. This close spacing of apertures 146 around the disk 140 provides numerous transverse paths or channels 148 through the stacked disks, even when the disks are randomly stacked (i.e., without alignment relative to one another). In a preferred embodiment, the diameter C of the aperture circle on the larger diameter disk 140 is greater than the diameter $D_2$ of the smaller diameter disk 142 by at least d so that the apertures 146 are disposed entirely in the respective vaporization areas 144.

The apertures 146 can be of any shape that has at least a width dimension of d. In a preferred embodiment, as illustrated in FIG. 3, the apertures 146 are circular openings having a diameter d. However, they can be squares, ovals, crescents, triangles, slits, or any other shape that meets the above criterion.

As shown most clearly in FIGS. 2A and 2B, the apertures 146 in each of the respective larger diameter disks 140 are sufficiently closely spaced so that a plurality of channels 148 extends in a generally transverse direction through the parallel stacked disks around the outside periphery of the smaller disks 142.

The diameter $D_1$ of the larger diameter disks 140 is preferably larger than the diameter $D_2$ of the smaller diameter disks 142 by a predetermined amount. The difference in sizes of the two pluralities of disks is believed to be critical to the invention, because accelerated vaporization occurs substantially all on those portions of the surfaces of the larger diameter disks 140 which extend beyond the outer periphery of the smaller diameter disks 142, thereby defining the vaporization areas 144. According to one preferred embodiment of the present invention, illustrated in FIG. 3, the diameter $D_1$ of the larger diameter disk 140 is greater than or equal to the sum of the diameter $D_2$ of the smaller diameter disk 142 and eight times the aperture width dimension d of apertures 146, or $D_1 \geq D_2+8d$. This relationship between the diameters of the larger and smaller disks depends on, among other things, the characteristics of the liquid to be vaporized, the temperature at which vaporization is to occur, and the velocity of the gas flow over the vaporization areas.

According to another preferred embodiment of the present invention, the diameter of the aperture circle C is greater than or equal to the sum of the diameter $D_2$ of the smaller diameter disk 142 and the aperture width dimension d, but less than or equal to the difference of the diameter $D_1$ of the larger diameter disk 140 and the aperture width dimension d, or $D_2+d \leq C \leq D_1-d$.

Accelerated vaporization is facilitated by: 1) the number and placement of the apertures 146 on each larger diameter disk 140 at a distance of not less than C/2 from the center of the disk, the diameter C of the aperture circle being greater than (by an amount equal to "d") or at least equal to the diameter $D_2$ of the smaller diameter disk 142, and 2) means 170 for establishing a liquid film on at least a portion of the surfaces of the larger diameter disks 140.

Figure 4:
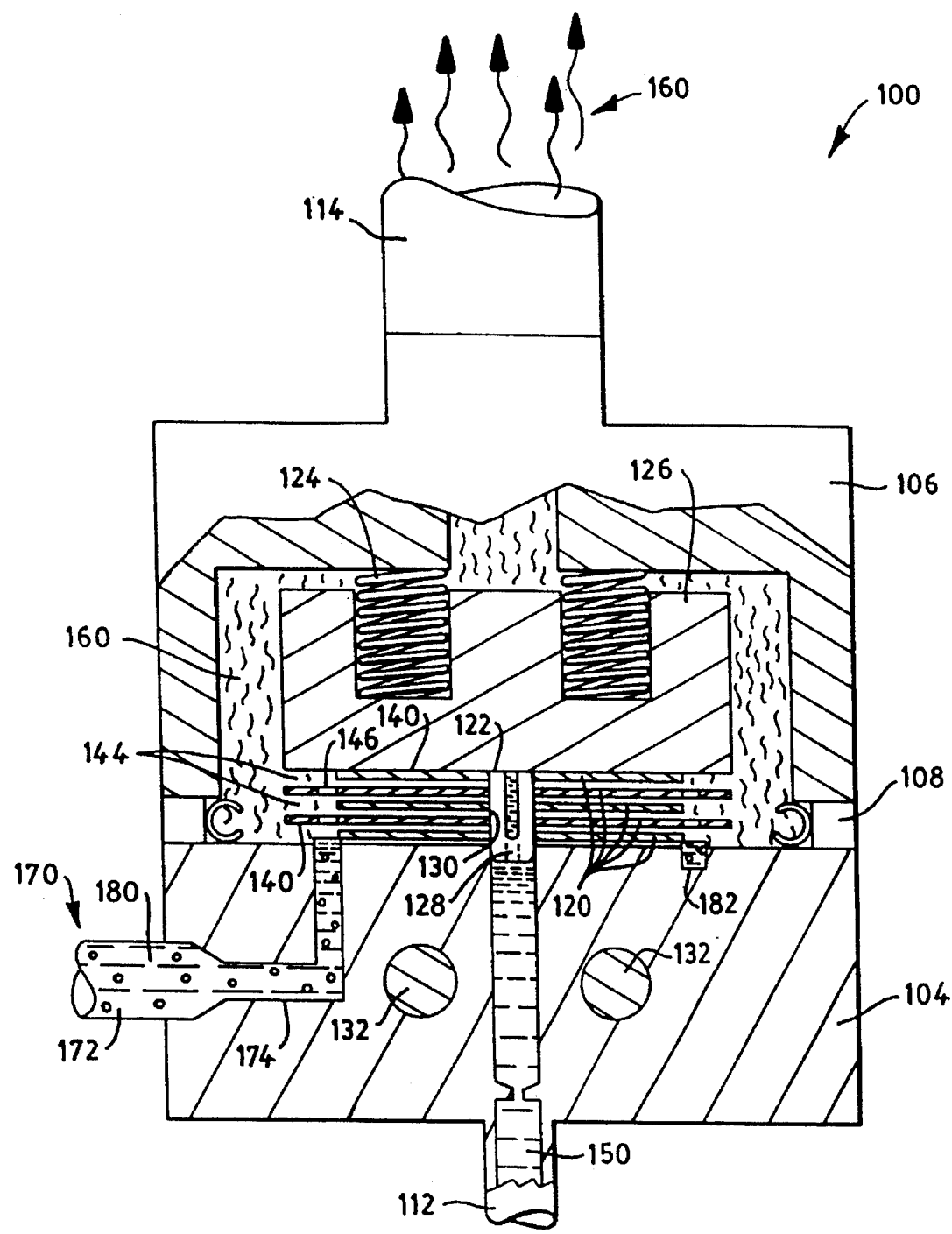
FIG. 4 is a side view, in partial cross section, of another embodiment of an evaporator vaporizer in accordance with the present invention and further including means for establishing a liquid film on at least a portion of the surfaces of the larger diameter disks.
Figure 5:
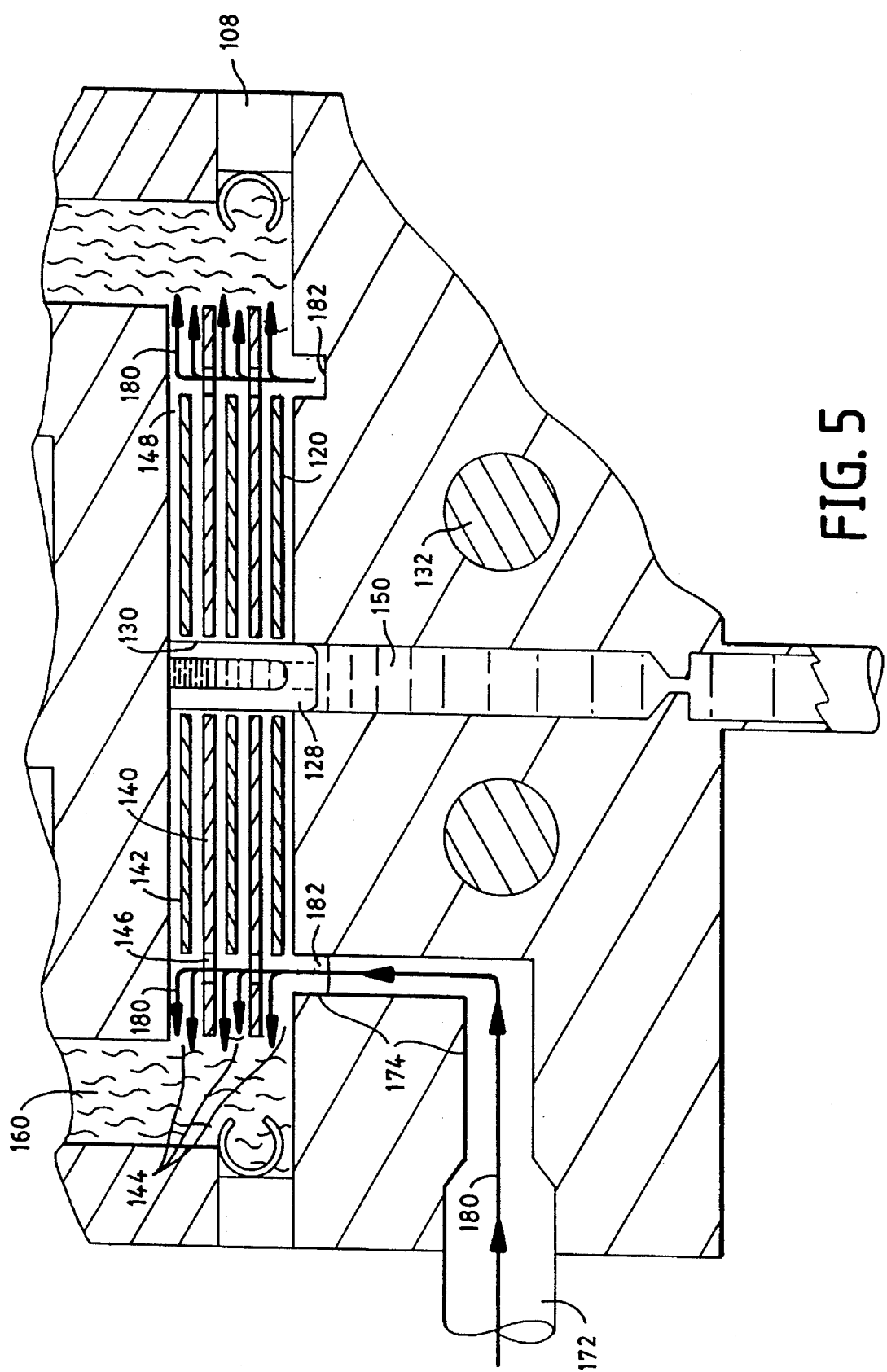
FIG. 5 is an enlarged, cross-sectional detail view of a portion of the vaporizer of FIG. 4 illustrating the flow of gas through the vaporizing chamber and through the apertures and over at least a portion of the surfaces of the larger diameter disks.

As illustrated best in FIGS. 4 and 5, liquid film establishing means 170 preferably includes means for transporting a gas 180 to the vaporization areas 146. Preferably, the liquid film establishing means includes a gas inlet 172 formed, for example, in the heating block 104 and means, such as a channel or passageway 174 provided in the heating block, for conducting a gas 180 from a gas source (not shown) outside of the vaporizing chamber 110 to the vaporization areas 144. The gas 180 flows into the vaporizing chamber 110 via channel 174, through the apertures 146 in the larger diameter disks 140 and thus through the transverse channels 148 into the vaporization areas 144, where the gas 180 moves radially outward from the apertures 146 along the surfaces of the larger diameter disks 140 in the areas 144 to the edges of the larger diameter disks, as illustrated by the arrows in the enlarged detail view of the vaporizer in FIG. 5. In order to insure that the gas 180 flows through all the transverse channels 148 at approximately the same pressure and flow rate, an annular well 182 (seen best in FIG. 5) having an inner diameter of $D_2$ and an outer diameter of ($D_2$+d) and coaxially aligned with the disks is in fluid communication with the passageway 174 so as to form an inlet plenum for the gas 180.

This difference in disk diameters, along with an appropriate placement of apertures 146 in the larger diameter disks 140, and the flow of gas 180 over at least a portion of the heated surfaces of the larger diameter disks 140, ensures that the gas 180 effectively "smears" the liquid 150 over those portions of the heated disk surfaces and reduces the liquid film thickness thereon. The result is an increase in the rate at which the liquid 150 can be vaporized. More importantly, the gas 180 increases the vaporization rate by accelerating the removal of vapor molecules from above the surface of the liquid.

As the gas 180 is transmitted through the heating block 104 it is preferably heated by the heating unit 132 prior to contacting the disks 140, so as to minimize heat dissipation from the disks.

The gas 180 can be any gas, regardless of its inertness, corrosivity or combustibility. Indeed, the selection of the gas will depend greatly on the particular liquid which is to be vaporized, as well as on the process parameters. For example, the gas 180 could be selected to be chemically reactive with a particular liquid 150 to facilitate the vaporization of the liquid.

Figure 6:
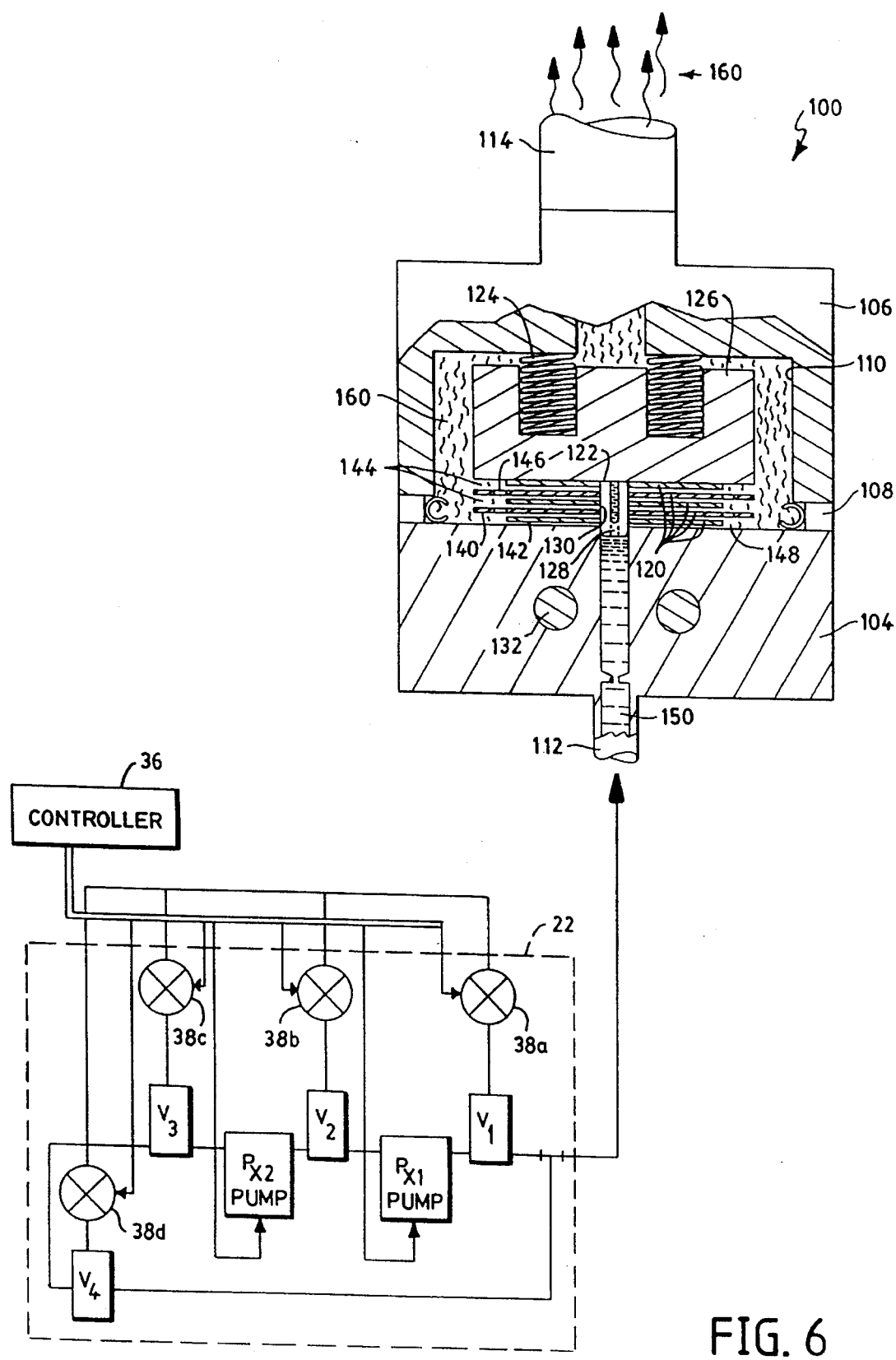
FIG. 6 is a schematic illustration of a liquid delivery system for delivering a liquid in vapor form according to another aspect of the present invention.

An apparatus for delivering a liquid in vapor form at a continuous and constant volumetric rate is illustrated schematically in FIG. 6. The apparatus includes a liquid vaporizer 100 as described previously, and a positive displacement pump system 22 coupled to the inlet port 112 of the evaporator vaporizer 100. The positive displacement pump system 22 includes a controller 36 which controls the sequence and operation of the various pumps and valves in the pump system to deliver a liquid 150 to the evaporator vaporizer 100 at a substantially continuous and constant volumetric rate and pressure. A detailed description of the operation of a preferred positive displacement pump system 22 in connection with a vaporizer is described in U.S. Pat. Nos. 5,361,800 and 5,371,828 to Ewing, each of which is hereby incorporated by reference into this application. It should be appreciated that other positive displacement pumps can be utilized.

Because certain changes may be made in the above apparatus without departing from the scope of the invention herein disclosed, it is intended that all matter contained in the above description or shown in the accompanying drawings shall be interpreted in an illustrative and not a limiting sense.

What is claimed is:

1. A liquid vaporizer comprising:

means for providing an enclosed vaporizing chamber having an inlet and an outlet;

a stack of coaxially-aligned, thermally-conductive, thin, flat disks comprising a first plurality of larger diameter disks of a first diameter $D_1$ stacked with a second plurality of smaller diameter disks of a second diameter $D_2$ smaller than $D_1$, thereby defining a smaller diameter disks of a second diameter $D_2$ smaller than $D_1$, thereby defining a vaporization area including those portions of the surfaces of the larger diameter disks which extend beyond the outer periphery of the smaller diameter disks, wherein said stack is positioned within said chamber between said inlet and said outlet so that a liquid entering said inlet is forced between adjacent disks of said stack and into said vaporization area so as to vaporize said liquid into a vapor prior to exiting said outlet;

biasing means for axially compressing the disks of said stack together; and heating means for heating the disks to a temperature sufficient to vaporize said liquid.

2. A liquid vaporizer according to claim 1, wherein each disk of each of said pluralities is adjacent to at least one disk of the other plurality.

3. A liquid vaporizer comprising:

means for providing an enclosed vaporizing chamber having an inlet and an outlet;

a stack of coaxially-aligned, thermally conductive, thin, flat disks comprising a first plurality of larger diameter disks of a first diameter $D_1$ stacked with a second plurality of smaller diameter disks of a second diameter $D_2$ smaller than $D_1$, wherein said stack is positioned within said chamber between said inlet and said outlet so that a liquid entering said inlet is forced between adjacent disks of said stack so as to vaporize said liquid into a vapor prior to exiting said outlet;

biasing means comprising a spring-biased anvil for axially compressing the disks of said stack together; and heating means for heating the disks to a temperature sufficient to vaporize said liquid.

4. A liquid vaporizer according to claim 1, wherein the heating means comprises a heating unit thermally coupled to at least one of the disks.

5. A liquid vaporizer according to claim 1, wherein each larger diameter disk includes at least one aperture.

6. A liquid vaporizer according to claim 5, wherein each disk of said first plurality further includes a plurality of apertures radially spaced from the center of said disk.

7. A liquid vaporizer according to claim 6, wherein said apertures are spaced on said disk around an aperture circle having a diameter "C", and wherein each of said apertures has a width "d", and wherein the spacing "S" between adjacent apertures is not greater than d/2.

8. A liquid vaporizer according to claim 7, wherein said apertures are radially spaced from the center of said disk at said distance C/2 so that C is not less than $D_2+d$.

9. A liquid vaporizer according to claim 8, wherein $D_2+d \leq C \leq D_1-d$.

10. A liquid vaporizer according to claim 7, wherein the apertures comprise circular openings having a diameter d.

11. A liquid vaporizer according to claim 5, further comprising means for establishing a liquid film on at least a portion of the surfaces of the disks of said first plurality and for accelerating the vaporization of said liquid.

12. A liquid vaporizer according to claim 11, further including a gas inlet port of said chamber, wherein the means for establishing a liquid film on at least a portion of the surfaces of the larger diameter disks and for accelerating the vaporization of the liquid comprises means for conducting a gas from a source of gas coupled to the gas inlet port of the chamber.

13. A liquid vaporizer according to claim 12, wherein the gas flows into the chamber, through the apertures in the disks of said first plurality and radially outward along the surfaces of the larger diameter disks to the edges of the larger diameter disks.

14. A liquid vaporizer according to claim 13, wherein said gas is heated by said heating means before said gas contacts said disks.

15. Apparatus for delivering a liquid in vapor form at a continuous and constant volumetric rate, said apparatus comprising, in combination:

a liquid vaporizer comprising (a) means for defining an enclosed vaporizing chamber having an inlet and an outlet, (b) a stack of coaxially-aligned, thermally-conductive, thin, flat disks comprising a first plurality of larger diameter disks of a first diameter $D_1$ stacked with a second plurality of smaller diameter disks of a second diameter $D_2$ smaller than $D_1$, thereby defining a vaporization area including those portions of the surfaces of the larger diameter disks which extend beyond the outer periphery of the smaller diameter disks, wherein said stack is positioned within said chamber between said inlet and outlet so that a liquid entering said inlet is forced between adjacent disks of said stack and into said vaporization area so as to flash vaporize said liquid into a vapor prior to exiting said outlet, (c) biasing means for axially compressing the disks of said stack together, and (d) heating means for heating the disks to a temperature sufficient to vaporize said liquid; and a positive displacement pump system coupled to said inlet of said vaporization chamber for delivering liquid to said evaporator at a substantially continuous and constant volumetric rate and pressure.

16. Apparatus according to claim 15, said liquid vaporizer further including means coupled to said outlet of said vaporizing chamber for removing said vapor.

17. Apparatus for delivering a liquid in vapor form at a continuous and constant volumetric rate, said apparatus comprising, in combination:

a liquid vaporizer comprising (a) means for defining an enclosed vaporizing chamber having an inlet and an outlet, (b) a stack of coaxially-aligned, thermally-conductive, thin, flat disks comprising a first plurality of larger diameter disks of a first diameter $D_1$ stacked with a second plurality of smaller diameter disks of a second diameter $D_2$ smaller than $D_1$, wherein said stack is positioned within said chamber between said inlet and outlet so that a liquid entering said inlet is forced between adjacent disks of said stack so as to flash vaporize said liquid into a vapor prior to exiting said outlet, (c) biasing means comprising a spring-biased anvil for axially compressing the disks of said stack together, and (d) heating means for heating the disks to a temperature sufficient to vaporize said liquid; and a positive displacement pump system coupled to said inlet of said vaporization chamber for delivering liquid to said evaporator at a substantially continuous and constant volumetric rate and pressure.

18. Apparatus according to claim 15, wherein said heating means comprises a heating element in thermal connection with at least one of said disks.

19. Apparatus according to claim 15, wherein each larger diameter disk includes at least one aperture.

20. Apparatus according to claim 15, wherein each disk of each of said pluralities is adjacent to at least one disk of the other plurality.

21. Apparatus according to claim 20, further comprising means for establishing a liquid film on at least a portion of the surfaces of the disks of said first plurality and for accelerating the vaporization of said liquid.

22. Apparatus according to claim 21, further including a gas inlet to said chamber, wherein said means for establishing a liquid film on at least a portion of the surfaces of said larger diameter disks and for accelerating the vaporization of said liquid comprises means for conducting a gas from a source of gas coupled to said gas inlet of said chamber.

23. Apparatus according to claim 22, wherein said gas flows into said chamber, through said apertures in said disks of said first plurality and radially outward along the surfaces of said larger diameter disks to the edges of said larger diameter disks.

24. Apparatus according to claim 22, wherein said gas is heated by said heating means before said gas contacts said disks.

25. Apparatus according to claim 20, wherein each disk of said first plurality further includes a plurality of apertures radially spaced from the center of said disk.

26. Apparatus according to claim 25, wherein said apertures are spaced on said disk around an aperture circle having a diameter "C", and each of said apertures has a width "d", and wherein the spacing "S" between adjacent apertures is not greater than d/2.

27. Apparatus according to claim 26, wherein said apertures are radially spaced from the center of said disk at said distance C/2 so that C is not less than $D_2+d$.

28. Apparatus according to claim 27, wherein $D_2+d \leq C \leq D_1-d$.

29. Apparatus according to claim 26, wherein said apertures comprise circular openings having a diameter d.

* * * * *